United States Patent
Harter et al.

[15] 3,698,809
[45] Oct. 17, 1972

[54] AUTOMATIC ILLUMINATION CONTROL FOR PHOTOGRAPHIC PRINTING APPARATUS

[72] Inventors: James E. Harter, Webster; Juan A. Rodriguez, Rochester, both of N.Y.

[73] Assignee: Eastman Kodak Company, Rochester, N.Y.

[22] Filed: Oct. 7, 1971

[21] Appl. No.: 187,480

[52] U.S. Cl. ................................................. 355/68
[51] Int. Cl. ................................................ G03b 27/78
[58] Field of Search ...355/38, 68; 356/205, 230, 231

[56] References Cited

UNITED STATES PATENTS

| | | |
|---|---|---|
| 3,076,378 | 2/1963 | Biedermann ................355/68 |
| 3,096,176 | 7/1963 | Craig ....................355/68 X |
| 3,263,556 | 8/1966 | Mey ......................355/38 |

Primary Examiner—Samuel S. Matthews
Assistant Examiner—Michael L. Gellner
Attorney—W. H. J. Kline

[57] ABSTRACT

Photographic printing apparatus includes a reference light source and a mirror with the mirror adapted to be moved into the normal projection path of the apparatus to reflect light from the reference light source through the printing lens and onto the print plane. A photocell in the print plane detects the light from the reference light source and effectively compares it with a reference potential to thereby control the opening of a diaphragm in the printing lens to maintain a constant illumination per unit area on the print plane.

8 Claims, 4 Drawing Figures

PATENTED OCT 17 1972　　　　　　　　　　3,698,809

JAMES E. HARTER
JUAN A. RODRIGUEZ
INVENTORS

BY

ATTORNEYS

AUTOMATIC ILLUMINATION CONTROL FOR PHOTOGRAPHIC PRINTING APPARATUS

CROSS REFERENCE TO RELATED APPLICATIONS

Reference is made herein to copending application Ser. No. D-34,252, entitled AUTO-FOCUSING PHOTOGRAPHIC PRINTING APPARATUS, assigned to the same assignee as the present application.

BACKGROUND OF THE INVENTION

This invention relates generally to printing apparatus and more particularly to improved illumination control mechanisms for use in photographic printing apparatus.

In the professional, commercial, and industrial photographic printing industry, it is often desirable to have photographic printers which handle several widths of printing paper and which are capable of producing prints of various sizes. For example, a professional photographer may wish to include in a photographic package from a single negative a range of picture portrait sizes, such as wallet size photographs, intermediate size photographs, and possibly 8 × 10 inch photographs for the customer. Typical of these situations are the class picture from a school, baby and children's photographs, etc. It is further desirable that each photograph in a package, except for the differences in size, exhibit essentially the same characteristics, such as color content and relative brightness. In many of the prior art printing apparatus capable of producing different size photographic prints, the relative illumination at the print plane may be adjusted by the printer operator, or in some instances, the light passed through the transparency is reflected from the print plane to a light detector which operates to control the diaphragm of the printing lens to thereby control the amount of light passing through. In the first instance great reliability is placed on the printer operator's ability to remember subjectively the desired brightness of the image at the print plane when changes in magnification are made. In the second instance, since the light is only detected from a small portion of the print area, as the print size is varied the light detector can be "fooled" depending on that portion of the transparency through which the detected light passes. Often to avoid these errors in the known apparatus, it is necessary to remove the transparency when changing magnification if it is desired to maintain a constant illumination per unit area at the print plane.

OBJECTS AND SUMMARY OF THE INVENTION

Accordingly, it is a principal object of this invention to provide photographic printing apparatus having improved illumination control capability.

Another object of this invention is to provide improved photographic printing apparatus which provides a substantially constant effective f-number over the entire magnification range of the apparatus.

Still another object of the invention is to provide improved photographic printing apparatus having illumination control capability automatically determined independently of operator control.

According to one aspect of the invention, the automatic illumination control is effected by comparing a set reference potential with a potential derived from a reference light source impinging on a photocell located in the print plane. A composing screen located in the print plane includes a photocell mounted in the center thereof. The reference light source is reflected to pass through the printing lens, without passing through the film transparency, and fall on the photocell. The output from the photocell is compared with the reference potential and the resultant therefrom operates on a motor to control the opening of a diaphragm in the printing lens, to thereby assure that the same relative illumination per unit area of the print plane is maintained over the entire magnification range of the apparatus.

DESCRIPTION OF THE PREFERRED EMBODIMENT

For a better understanding of the invention together with other and further objects thereof, references made to the following detailed description taken in conjunction with the above described drawings.

Figure 1:
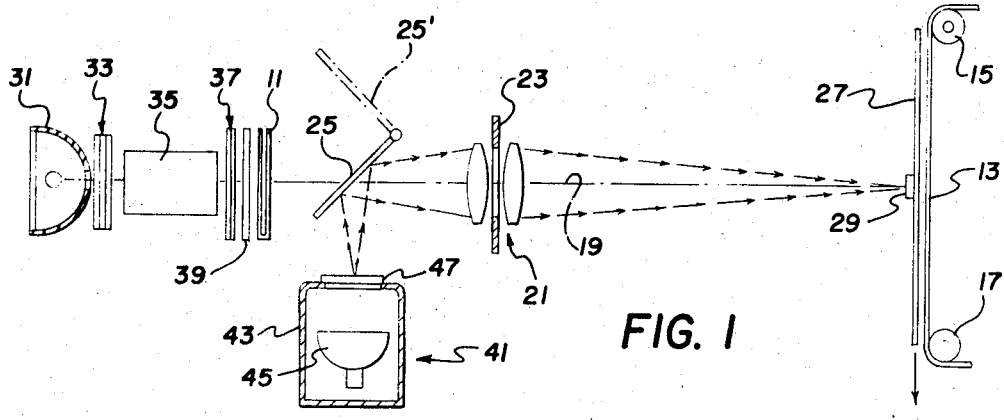
FIG. 1 is a diagrammatic, elevational representation of a photographic printing apparatus according to the present invention.

Referring first to FIG. 1, therein is shown a negative holder 11 which defines a negative focal plane, and a print plane defined by print paper 13 passing between guide rollers 15 and 17. Lying along an optical axis 19 between the print plane 13 and the negative holder 11 is a lens apparatus 21 including a diaphragm 23. The lens apparatus operates to focus and magnify the image from the negative holder onto the print plane 13. As will become apparent later, the diaphragm 23 is adjustable to vary the opening through the lens apparatus 21. Positioned between the negative holder and the lens apparatus is a surface mirror 25. Disposed in front of the print plane 13 is a composing screen 27 having mounted thereon a photocell 29. While not shown, the composing screen is slidably mounted in the system and during an expose operation is removed from in front of the print plane. When the composing screen is located in front of the print plane, the photocell is positioned to lie along the optical axis 19. Mounted behind the negative holder 11 is a printing lamp apparatus 31 which would typically include a printing lamp, a reflector, and a cold mirror. In front of the opening in the printing lamp apparatus is a grouping of filters, heat screen, and dark shutter 33 followed by an integrator light box 35. In front of the integrator light box is a filter pack 37 and in front of that behind the negative plane is a diffuser 39. Disposed below the optical axis between the negative plane and the lens apparatus is a regulated light source 41, which includes a housing 43, a lamp 45, and a diffuser 47 over the end of the housing 43, directed toward the mirror 25. As indicated in the drawing, the mirror 25 is hingedly mounted so that it can be moved out of the optical plane as indicated by the position 25'.

The diffuser 47 associated with the regulated light source 41 is positioned to be in the same effective focal plane as the negative holder 11 and its associated diffuser 39. Thus when the mirror 25 is in the position indicated by the solid line, the diffuser 47 will be the same optical distance from the lens as the diffuser 39. During setup, the dark shutter in the package 33 is positioned between the printing lamp apparatus 31 and the integrator light box 35, so that no light from the printing lamp apparatus passes through the system. The light from the lamp 45 is reflected by the mirror 25, passes through the lens apparatus 21, and impinges upon the composing screen 27 which is located in front of the print paper and plane 13. The photocell 29 detects the amount of light per unit area falling on the composing screen and develops therefrom a signal which is compared to a reference level. Depending on the relation between the signal and the reference level, the diaphragm 23 is adjusted to the proper opening. Once the setup has been completed, the composing screen is moved away from the print area, the mirror 25 is moved out of the optical axis to its position 25' and the dark shutter is removed from between the printing lamp apparatus 31 and the integrator light box 35 to expose the print paper 13 by passing light through the transparency located in the holder 11.

Figure 2:
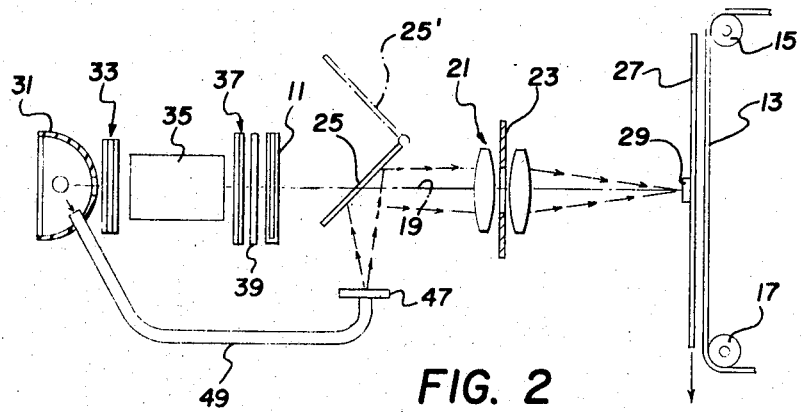
FIG. 2 is a diagrammatic, elevational representation of an alternate embodiment of the apparatus of FIG. 1.

Referring next to FIG. 2, there is illustrated a slightly modified version of the present invention, as well as showing the action of the apparatus as the magnification of the system is changed. In this embodiment, the regulated light source 41 is replaced by a light tube 49 which passes a portion of the light from the printing lamp apparatus around the dark shutter and projects it through the diffuser 47 onto the mirror 25. Except for this difference the apparatus of FIG. 2 operates the same as the apparatus of FIG. 1.

The apparatus of FIG. 2 also illustrates how the system is intended to operate under reduced magnification. As can be readily seen the distance between the negative holder 11 and the print plane is substantially reduced, thereby indicating a reduction in the magnification of the print to be exposed on the paper 13. The light reflected from the mirror 25 through the lens apparatus 21 and onto the photocell 29 has caused the diaphragm opening 23 to be reduced to thereby limit the amount of light impinging on the composing screen 29 so that the same relative illumination per unit area occurs as in the case of the greater magnification shown in FIG. 1. With this configuration, the apparatus maintains a constant effective *f*-number over the entire magnification range of the system during exposure.

A printer apparatus which includes means for varying the magnification of an image on a print plane which could utilize the present invention is described in copending application serial number D–34,252 entitled AUTO-FOCUSING PHOTOGRAPHIC PRINTING APPARATUS, assigned to the same assignee as the present application.

Figure 3:
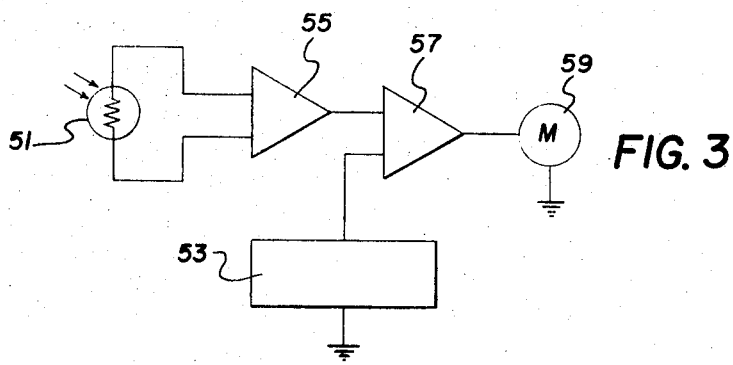
FIG. 3 is a schematic block diagram of control circuitry adapted to be utilized with the present invention.
Figure 4:
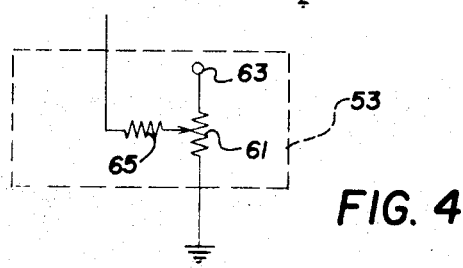
FIG. 4 is a schematic diagram of a source of reference potential for use with the circuitry of FIG. 3.

Referring now to FIG. 3, there is shown in partial schematic form one circuit capable of controlling the diaphragm opening of the lens apparatus 21 of FIG. 1. A photocell 51, corresponding to the photocell 29 of FIGS. 1 and 2, is connected across the inputs to an amplifier 55. In this configuration the amplifier 55 might be a current-to-voltage converter. The output of the amplifier 55 is applied to one input of a comparator amplifier 57, the second input of which is connected to a variable source 53 of reference potential. The source 53 of reference potential could be as shown in FIG. 4, consisting of a potentiometer 61 connected between a voltage source 63 and ground. The centertap of the potentiometer 61 is connected via a resistor 65 to the second input of the comparator amplifier 57. The output of the comparator amplifier is applied to the drive motor, indicated generally as 59, for the diaphragm of the lens apparatus 21.

According to one embodiment of the invention the reference source 53 is established as, for example, a factory or setup adjustment and is not under the control of the printer operator. The reference 53 is set to provide the equivalent of an effective constant *f*-number for all magnifications; in other words, the illumination per unit area on the print plane is held constant. However, it would be possible, and in some instances might be desirable, to place the reference source 53 under the control of the printer operator to be set for each film transparency from which prints are to be made. In such a situation a null meter might be connected to the output of the comparator 57 and after the composing is completed for a given magnification, the diaphragm opening is set and the source 53 is varied until the null point is read on the comparator 57 output.

In operation, the output from the amplifier 55 as determined by the amount of light received by the photocell 51 might be above or below the voltage output from the reference source 53, and the output from the comparator 57 can vary above or below a reference level, which for convenience could be set at a zero voltage level. Therefore, if we assume that a positive output from the comparator corresponds to an excessive amount of light and a negative output corresponds to a deficiency of light as detected by the photocell, the positive output will drive the motor assembly 59 in a direction to close the diaphragm opening, and the negative output will drive the motor assembly in the opposite direction to increase the diaphragm opening.

While not shown in FIGS. 1 and 2, it is readily apparent that a simple motor/gear arrangement could be connected to the mirror 25 and the dark shutter in the cluster 33, so that once the composing is completed and prior to exposure, the mirror and dark shutter are positioned as shown in FIGS. 1 and 2 to block light in the normal projection path and direct light from the reference source onto the print plane to effect the constant illumination. Once the diaphragm 23 opening is established, the motor would move the dark shutter and mirror out of the projection path.

The foregoing descriptions are presented by way of illustration of preferred embodiments, but are not intended to be limiting of the invention, since it will be readily apparent to those skilled in the art that many modifications and variations may be made therein. For example, the photocell detector might be any light responsive device and could be connected either as a current source or a voltage source. Also, rather than use a reversible diaphragm motor, the diaphragm could be opened wide prior to each operation or magnification setting, so that the motor would only have to drive in one direction to attain the appropriate closure.

Therefore, while the invention has been described in detail with particular reference to preferred embodiments thereof, it will be understood that variations and modifications can be effected within the spirit and scope of the invention.

We claim:

1. In photographic printing apparatus including a print plane adapted to receive paper for printing, a transparency holder and a projection light source adapted to be directed through a transparency in the holder for projection onto the print plane, lens means including a diaphragm interposed between said transparency holder and said print plane for magnifying and focusing the image of said transparency on said print plane, and means for varying the magnification of an image projected onto said print plane, improved illumination control apparatus comprising:

a first source of reference potential corresponding to a predetermined illumination per unit area on the print plane;

a reference light source;

means for directing light from said reference light source through said lens means for projection onto the print plane;

light detecting means in the print plane for intercepting light from said reference light source operative to produce an output proportional to the illumination level; and means for comparing the output of said light detecting means with said reference potential and for thereby controlling the opening of the diaphragm of said lens means to provide the predetermined illumination per unit area on the print plane.

2. The invention according to claim 1 wherein said light detecting means is a photocell.

3. The invention according to claim 2 additionally comprising a composing screen adapted to be inserted into the print plane, wherein said photocell is mounted on said composing screen.

4. The invention according to claim 2 said comparing and controlling means comprising:

a current-to-voltage converter amplifier having first and second input terminals and an output terminal;

means connecting said photocell across the first and second input terminals of said current-to-voltage converter amplifier;

a voltage converter amplifier having first and second input terminals and an output terminal;

means connecting the output of said current-to-voltage converter amplifier to the first input terminal of said voltage comparator amplifier;

means for applying said source of reference potential to the second input terminal of said voltage comparator amplifier; and a drive motor connected between said diaphragm and the output of said voltage comparator amplifier operative to vary the opening of said diaphragm in response to the output of said voltage comparator amplifier.

5. The invention according to claim 1, wherein said reference light source is located outside of the direct light path between said projection light source and the print plane, additionally comprising:

a reflective mirror located between said transparency holder and said lens means;

means for positioning said reflective mirror in a first position in said light path to reflect light from said reference light source through said lens means onto said print plane; and means for positioning said reflective mirror in a second position out of said light path, whereby light from said reference light source does not pass through said lens apparatus.

6. The invention according to claim 5 wherein said reference light source comprises:

a source of illumination; and a diffuser positioned between said source of illumination and said reflective mirror such that when said mirror is in said first position, said diffuser is in the same effective focal plane as said transparency holder.

7. The invention according to claim 6 wherein said source of illumination comprises a lamp.

8. The invention according to claim 6 wherein said source of illumination comprises a fiber optic light rod between said projection light source and said diffuser.

* * * * *

PO-1050
(5/69)

UNITED STATES PATENT OFFICE
CERTIFICATE OF CORRECTION

Patent No. 3,698,809                    Dated Oct. 17, 1972

Inventor(s) James E. Harter, Juan A. Rodriguez

It is certified that error appears in the above-identified patent and that said Letters Patent are hereby corrected as shown below:

In the specification, column 1, line 6, cancel beginning with "copending application" to and including "PRINTING APPARATUS," and insert -- U.S. Patent No. 3,728,019 entitled AUTO-FOCUS PRINTING BELOW 1,1X MAGNIFICATION, --. Column 3, line 55, cancel beginning with "copending application" to and including "PRINTING APPARATUS," and insert -- U.S. Patent No. 3,728,019 entitled AUTO-FOCUS PRINTING BELOW 1,1X MAGNIFICATION, --.

Signed and sealed this 10th day of December 1974.

(SEAL)
Attest:

McCOY M. GIBSON JR.                    C. MARSHALL DANN
Attesting Officer                       Commissioner of Patents